March 2, 1971   L. G. HAYS   3,566,676

FLUID PHASE ANALYZER

Filed April 17, 1969   2 Sheets-Sheet 1

INVENTOR.
LANCE G. HAYS

BY *Inderberg & Freilich*

ATTORNEYS.

March 2, 1971  L. G. HAYS  3,566,676
FLUID PHASE ANALYZER
Filed April 17, 1969  2 Sheets-Sheet 2
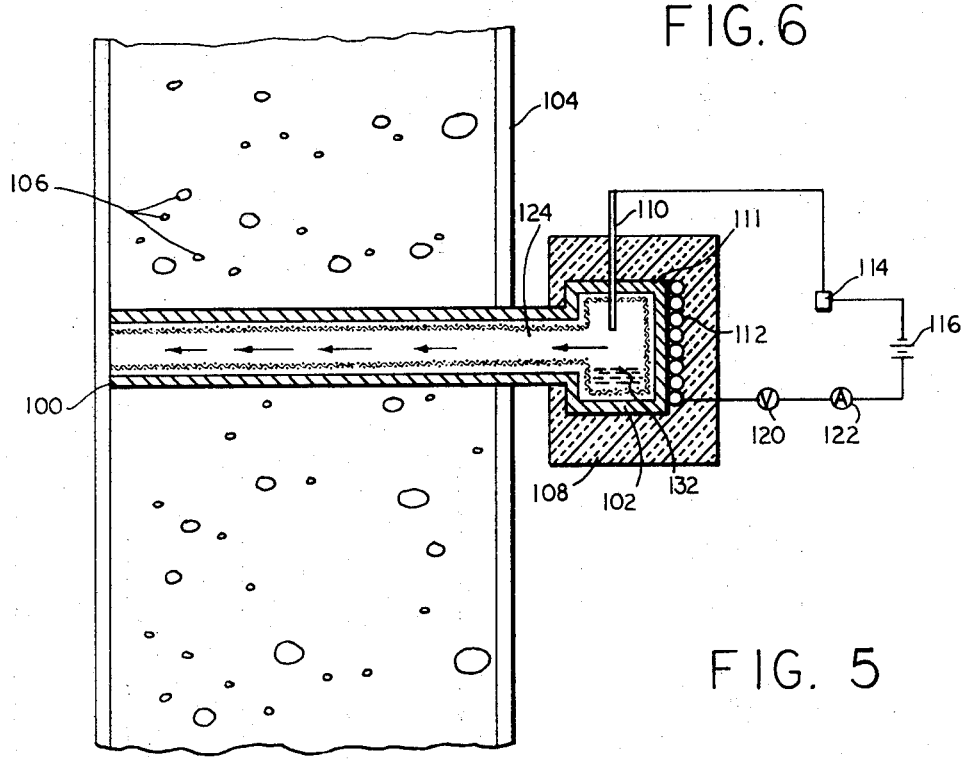
FIG. 6
FIG. 5
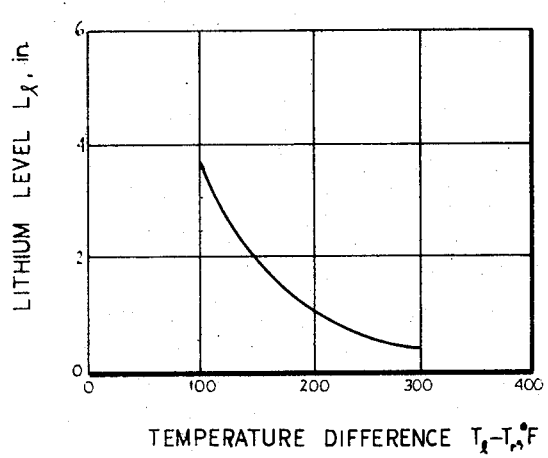
FIG. 4
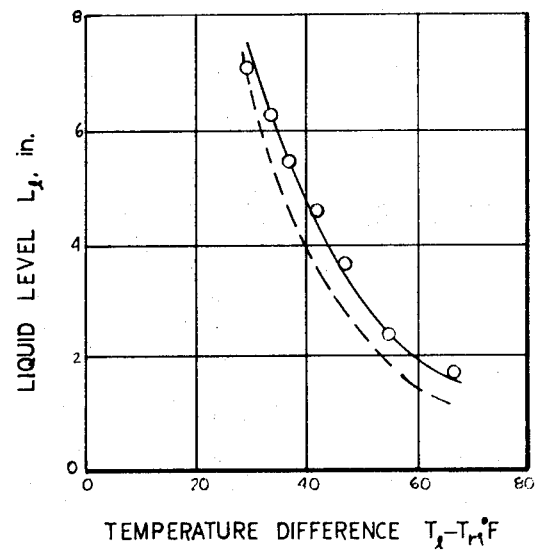
INVENTOR.
LANCE G. HAYS
BY Lindenberg & Freilich
ATTORNEYS.

United States Patent Office 3,566,676
Patented Mar. 2, 1971

3,566,676
FLUID PHASE ANALYZER
Lance G. Hays, Pasadena, Calif., assignor to the United States of America as represented by the Administrator of the National Aeronautics and Space Administration
Filed Apr. 17, 1969, Ser. No. 816,988
Int. Cl. G01n 25/00
U.S. Cl. 73—61                                    15 Claims

ABSTRACT OF THE DISCLOSURE

An analyzer for determining the relative amount of liquid and vapor in a mixed phase body of fluid. A hollow closed-end gage containing a heat transport fluid and having its walls lined with a capillary wick is partially inserted into contact with both phases of the body. Heat is exchanged with the body and heat is transferred from the portion immersed in the body to an external portion of the gage. In one embodiment a thermocouple attached to the external portion measures a parameter related to the heat transferred and therefore the phase distribution. In another embodiment, the thermocouple is utilized to maintain the wall temperature at a fixed temperature and energy input to a heater associated with the external portion provides the desired parameter.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The present invention relates to a device and method for analyzing or monitoring vapor and liquid phases in static or flowing two-phase bodies of fluid. More particularly, this invention relates to a probe for determining the liquid level in a vessel or the ratio of liquid to vapor in a two-phase flowing stream.

(2) Description of the prior art

Modern technology has progressed to the point where devices are being constructed and operated at the extremes of very high and very low temperatures. More and more operations are being conducted at cryogenic temperatures and there is substantially more activity involving process streams formed of mixtures of molten metal and vapors. Specific examples of commercial operations would be the cryogenic streams of hydrogen gas supplied to hydrogen arc jet units and the molten liquid metals which form a part of magnetohydrodynamic systems and are also utilized in breeder nuclear reactors.

However, known liquid level monitoring systems are not capable of effectively operating at these extreme temperatures and require the complex measurement of multiple variables. For example, gamma ray detectors measure overall stream density changes but these units require complicated readout circuits, are limited to detector temperatures under 200° F. and are difficult to calibrate due to gamma ray absorption by the walls containing the stream. Ultrasonic flow analyzers have been used for temperatures and require the complex measurement of multitems. Rather simple electric resistance and capacitance probes have been used but they are unreliable due to insulator breakdown at the higher temperatures encountered in the environment of molten metals.

OBJECTS AND SUMMARY OF THE INVENTION

It is therefore an object of the invention to provide a light-weight, efficient device for analyzing gas-liquid phase systems, having no moving parts and which supplies characteristic data concerning the system by measurement of a minimum number of variables.

Another object of the invention is the provision of a reliable, longlife probe apparatus which can be utilized over an extremely wide range of temperatures.

A still further object of the invention is the provision of a system that is readily fabricated at low cost and can be utilized in any extreme of temperature and radioactivity that can be tolerated by the flow system or vessel itself.

Yet another object of the invention is the provision of an accurate, reliable and simple device that readily and effectively provides a measure of the ratio of liquid to gas in static or moving systems.

These and other objects and many attendant advantages of the invention will become apparent as the description proceeds.

The analytical device according to the invention comprises an elongated heat conducting probe having a first portion insertable into a container enclosing a two-phase body of fluid and a second portion extending from said container. Means are provided for transferring heat between said portions and for measuring the amount of heat exchanged or a quantity or parameter related to the heat exchanged between said body of fluid and the portion of the probe surrounded by said body to determine the relative amounts of each of the phases. Phase ratio is determined by inserting the first portion of the heat conducting probe into the body with the other portion extending from the container. Heat is exchanged between the body of fluid and the probe portion surrounded by the body and heat is transferred between the sections. The relative ratio is determined by measuring the amount of heat exchanged between the immersed portion of the probe and the body of fluid.

The two-phase body may be formed of a single component or the droplets of one material may be dispersed in the vapor of another material or a vapor of one material may be present in the headspace of the container storing a liquid formed of a second material. Moreover, the probe of the invention may operate either by adding heat to the body of fluid or by removing heat from the body.

In the first case, heat can be added to the external portion of the probe, transferred to the internal portion and exchanged with the body of fluid. The amount of power supplied to the heater required to maintain the probe at a selected fixed temperature would be proportional to the ratio of the phases. In the second case the cooler internal portion of the probe absorbs heat from the body. The heat is transferred to the external portion and then to ambient. The temperature of the latter portion is a measure of the amount of heat being extracted from the body and is therefore characteristic of the composition of the body.

The invention will now become better understood by reference to the following detailed description, when considered in conjunction with the accompanying drawings.

BRIEF DESCRIPTION OF THE DRAWINGS

FIG. 4 is a graph of lithium level vs. temperature difference for a body of lithium at 2000° F.

FIG. 5 is a graph comparing the measured and calculated liquid levels of a static body Dow-Therm A at 250° F.; and FIG. 6 is a cross sectional view of a flow detecting and quantitating device according to the invention.

DESCRIPTION OF THE PREFERRED EMBODIMENTS

Figure 1:
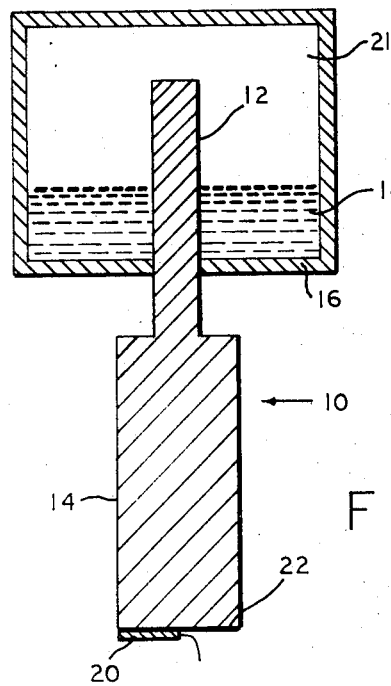
FIG. 1 is a front sectional view of a first embodiment of a quantitative phase determining device according to the invention.

Referring now to FIG. 1 the apparatus according to the invention generally includes a probe 10 having high thermal conductivity and heat exchange measuring means such as a thermocouple 20 attached to probe 10. The probe has a first or internal portion 12 extending through the wall 16 of a container into contact with liquid and vapor phases 18 and 21 stored therein. The internal portion of the probe 12 is connected to the second or external portion 14. The thermocouple 20 is applied to the end wall 22 of section 14.

In this first embodiment, the probe is being utilized as a level indicator and operation is based on the principle that heat transferred from a liquid phase is much greater than from a vapor phase. If the total heat input to the probe is measured, it will be directly proportional to the length of the probe in contact with liquid. In the probe of FIG. 1, the heat input from the liquid phase 18 and the vapor phase 21 is transferred by conduction from the internal probe section 12 to the external probe section 14 where the heat is rejected by radiation or convection. Since the area of the radiating or convecting section is fixed, the temperature of the radiating or convecting section will vary in accordance with the total heat input and therefore with the liquid level stored within container 16. The resultant probe is a very simple and rugged construction and provides a reliable, high-level signal.

A rise in liquid level in the vessel is monitored as a function of the increased heat transfer resulting when increasingly longer lengths of the internal section of the probe are contacted by the stored liquid. In addition to conduction through a solid probe, the probe may be hollow and a static body of liquid or gas may be utilized to transport the heat absorbed from the contained medium to the external temperature measuring area. The parametric temperature difference over a fixed distance of the probe may be utilized to determine the heat transport and therefore relative ratio of the phases.

Figure 2:
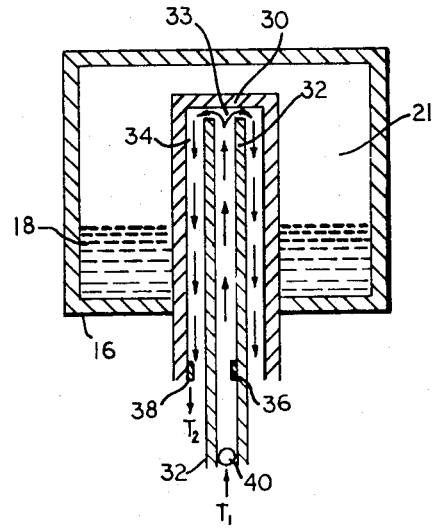
FIG. 2 is a cross sectional view of a further embodiment of the inventive apparatus.

Forced convection of a liquid or a gas may also be utilized to absorb or deliver heat to the contained body to provide a measurable parameter related to the relative ratio of the phases within the container. Referring now to FIG. 2, the internal section 12 of the probe may include a hollow closed end tube 30 containing a central inlet tube 32. A fixed mass flow of liquid enters tube 32 and flows upwardly into distributing headspace 33 and then down the annular passage 34 past the stored body of liquid. A first temperature sensor 36 is provided at a fixed inlet point and a second outlet temperature sensor 38 is provided at a second fixed point. A flow meter 40 is provided on the inlet line 32. By measuring the flow rate and temperature change of the flowing liquid or gas the heat transfer betweeen the stored body of liquid and gas in the internal section of the probe may be measured.

The embodiments described in FIGS. 1 and 2 are found to very inefficiently transfer heat from one end of the probe to another. Solid metals even though they conduct heat much better than liquids or gases are still poor conductors of heat. Copper, for instance, is usually regarded as one of the best conductors of heat. Yet if a thermal power of 10,000 watts were applied to one end of a solid copper bar one inch in diameter and one foot long, the temperature difference along the bar could theoretically exceed 30,000° F. the is, one end would become a vapor hotter than the surface of the sun while the other end would remain at room temperature.

Figure 3:
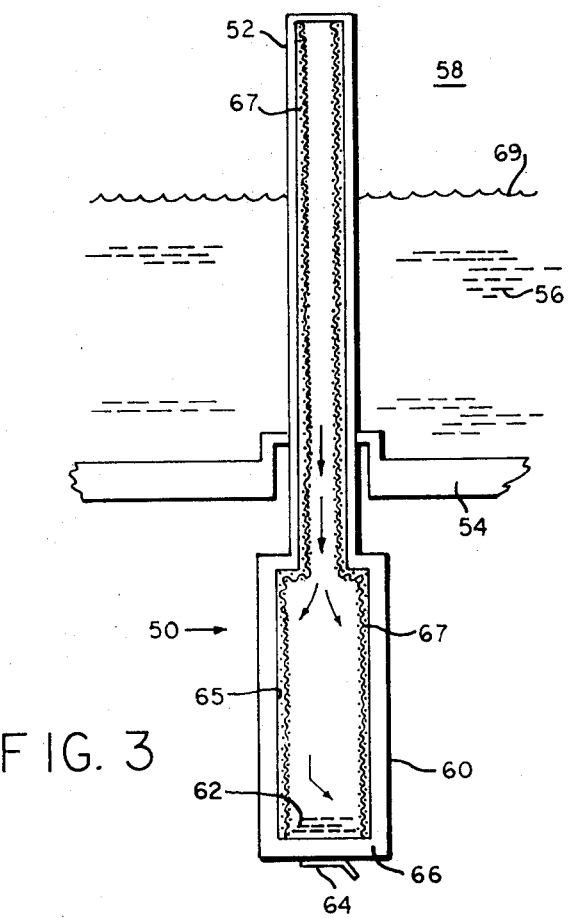
FIG. 3 is a cross sectional view of a liquid level determining apparatus according to the invention.

Referring now to FIG. 3, the embodiment of the invention illustrated herein is based on the "heat pipe" principle and can be several thousand times more effective in transporting heat than the best metallic conductors. The heat pipe is a closed tubular pipe partially filled with a heat transport fluid selected to have a reasonable vapor pressure at the temperature of the body of fluid in the vaporizing temperature vessel. At the boiler end of the heat pipe, heat is absorbed from the environment and causes vaporization of the internal heat transfer fluid. The vapor expands, permeates the pipe and condenses in the condenser zone portion thereof giving up its latent heat of vaporization in the process. The condensate is then returned to the boiler end suitably by means of gravity flow in the case where the probe is inserted into the container with the condenser zone provided above the boiler zone. However, in accordance with the invention, it is preferred to return the condensate to the boiler section by means of capillary flow which can be provided by roughening the interior walls of the pipe and preferably by providing a wick attached to the interior wall of the device.

The function of the working fluid within a heat pipe is to absorb the heat energy received at the evaporator or boiler section, transport the energy through the pipe and release this energy at the condenser section. This process is called vapor heat transfer. It is important to note that the vaporized fluid stores heat energy at the temperature at which the vapor was created and it will retain the energy at that temperature until it meets a colder surface. The result is that the temperature along the entire length of the heat pipe ends to remain substantially constant. It is this tendency to resist temperature change that is responsible for the high thermal conductance and makes it an ideal structure for utilizing as the probe member in the phase determining device of the invention.

The return of the condensed liquid to the boiler or evaporator section could be accomplished by a pump or by gravity. However, gravity requires that the boiler always be located above the condenser which is not always convenient. A separate pump eliminates the restriction as to the arrangement of the sections but it requires outside energy for its operation and also adds the complexity of control and reduced reliability.

A heat pipe incorporating a capillary pumping action can operate against gravity or in no gravity situations and does not need any external energy to move the fluid. Movement of the working fluid is accomplished by capillary action within the wick that connects the condenser to the boiler zone. The driving force that causes movement is the surface tension of the liquid.

A device designed for the measurement of the level of 2000° F. molten lithium-cesium vapor in a chamber is illustrated in FIG. 3. The device includes a hollow metal T-shaped gage 50 having a probe portion 52 and a reservoir portion 60. A thermocouple 64 is attached to the bottom wall 66 of the reservoir 60. The gage is positioned with its probe portion 52 inserted through the wall 54 of the storage vessel. The probe portion 52 extends through the molten lithium body 56 and into the supernatant cesium superheated vapor body 58.

The probe portion 52 is connected to an external reservoir portion 60. The reservoir 60 contains a body of lithium liquid 62 which in this case acts as the internal heat transport fluid. The internal walls 65 of the gage 50 are lined with a porous wick-like material 67 such as a niobium-1% zirconium mesh. The body of the probe is suitably formed of the same high temperature alloy.

During operation the internal molten liquid lithium is pumped up the walls of the probe by means of the capillary surface tension pumping. The internal liquid 62 that is adjacent the wall portions which are contacted by the external liquid is subject to evaporation whereas the liquid in the portion of the tube 52 above the liquid level 69 is subject to much much less evaporation.

The internal liquid on the walls of the probe portion immersed in the body of liquid 56 absorbs heat from the external liquid and evaporates to form a body of vapor which moves downwardly into reservoir area 60. The heated vapors contact the colder walls of reservoir 60 and condense to replenish the supply of internal liquid lithium 62 which continues its journey upwardly into the probe area 52. The heat released to the reservoir walls 60 is radiated into vacuum in this case.

This level gage utilizes the principle that the natural convection heat transfer coefficient for a liquid is much greater than that of a vapor or gas. If heat is removed from the heat pipe portion in contact with the body of liquid and temperatures the body of liquid and the tube wall are held constant then the amount of heat exchanged between the liquid and gas in the vessel and the heat pipe is proportional to the amount of the probe which is in contact with the liquid. Measurement of this total amount of heat or of a quantity proportional to this amount provides a measure of the liquid level. If the relationship between the tube wall temperature and the heat removal rate is fixed or known, then the tube wall temperature can be allowed to vary. Measurement of the tube wall temperature, heat removal rate or a quantity proportional to either then provides a measure of liquid level.

For the probe of FIG. 3 the heat input to the internally cooled probe is directly proportional to the length of the probe in contact with the liquid metal. The heat input is transferred by the heat pipe action to the reservoir section where the heat is rejected by radiation. Since the area of radiation is fixed the temperature of the radiating section is determined by the total heat input and hence is a measure of the liquid level.

The approximate relationship (neglecting heat pipe and wall temperature differences) that holds between liquid and level temperature is:

$$\pi d_0 (L_0 - L_1) \bar{h}_v (T_1 - T_r) + \pi d_0 L_1 \bar{h}_1 (T_1 - T_r) = A_r \sigma \epsilon (T_r^4 - T_e^4)$$

where $d_0$ = probe diameter
$L_0$ = probe length
$L_1$ = liquid level
$\bar{h}_v$ = vapor heat-transfer coefficient
$\bar{h}_1$ = liquid heat-transfer coefficient
$T_1$ = liquid temperature
$T_r$ = radiating temperature
$T_e$ = ambient temperature
$A_r$ = radiating area
$\epsilon$ = emissivity
$\sigma$ = Stefan-Boltzman constant For the case $\bar{h}_v \ll \bar{h}_1$, $$L_1 \approx \frac{A_r \sigma \epsilon (T_r^4 - T_e^4)}{\pi d_0 \bar{h}_1 (T_1 - T_r)}$$

Thus, for a fixed geomery, the liquid level is a function of the natural convection coefficient $\bar{h}_1$, the lithium temperature $T_1$, the ambient temperature $T_e$, and the radiating temperature $T_r$. During a period of time when the first three parameters are nearly constant, measurement of $T_r$ will provide a measure of the level. The calculated relation between 2000° F. lithium level and radiating temperature $T_r$ for the geometry of the separator probe of FIG. 3 is shown in FIG. 4. This calculation included the effect of wall temperature differences and the variation of $\bar{h}_1$ with $L_1$. A change in level of three inches results in a change in thermocouple output of 100° F. Calibration of the probe at one level can be used to establish the actual operating curve.

The predicted behavior was checked with a similar level indicator at lower temperature with water as the heat pipe fluid. In this probe the heat rejection from the radiator was accomplished by natural convection. The unit was tested by varying the level of Dow-Therm A heated to 250° F. with the result shown in FIG. 5. The measured temperature difference agrees with the calculated value within 15%, and the theoretical variation of temperature with level is followed closely.

The temperature of the two-phase fluid medium and the vaporization temperature of the internal heat transport fluid determine whether the heat transport to be measured is to be extracted from the medium or added to the medium. For example, if the desired vaporization temperature of the heat transport fluid is below the temperature of the medium, heat can be removed from the two-phase external fluid. If the vaporization or condensation temperature is above that of the two-phase fluid heat in the form of the latent heat of vaporization may be added to the external two-phase fluid. The probe device of the invention can be utilized at extremely high and extremely low temperatures to determine the relative amounts of phases in static or moving bodies of mixed vapor and liquid phases. The bodies of fluid being analyzed may be either single component or mixed component type.

An embodiment of the analysis device of the invention useful in determining the amount of liquid in a two-phase flowing stream is illustrated in FIG. 6. The device is again in the form of a hollow tubular closed end heat pipe having a probe section 100 and a reservoir section 102. The probe segment 100 of the gage is positioned within the process stream conduit 104 so that the liquid droplets 106 and the gas phase molecules (not shown) impinge directly and continuously upon the outer walls of the probe segment 100.

The reservoir 102 is in this embodiment encapsulated in a block of thermal insulation 108. The reservoir is further provided with a thermocouple well 110 and a heating coil 112 is attached to the end wall 111 of the reservoir 102. The output from the thermocouple 110 is utilized to operate a relay 114 which actuates the power source 116 for the heating coil 112. The heating coil circuit further includes a voltmeter 120 and an ammeter 122 to provide a continuous reading of the energy input to the coil 112.

The internal walls of the entire device including probe segment 100 and reservoir segment 102 are covered with a porous wick-like surface coating 124 having the ability to wet the liquid and allow it to rise by surface-tension, capillary forces.

The instantly described device is intended to operate at a fixed temperature slightly above the temperature of the mixed-phase fluid stream within the conduit 104. The relay system and controller actuated by the thermocouple send power to the heater to maintain this constant temperature. The heating of the internal heat transport liquid 132 present within the reservoir structure by means of the heating coil creates vapor which again permeates the entire device. The vapor rises to the probe section 100 and transfers its heat across the wall of the probe to the droplets present on the exterior wall of the probe. In the process of transferring the heat, the vapor condenses and the capillary forces provided by the wick-like coating 124 return the condensed working fluid back to the reservoir of evaporating zone 102 of the device adjacent to the heater 112.

During operation the device operates as a closed tube cycle with internal heat transport of a condensing and evaporating fluid which normally maintains all of the surfaces at a uniform temperature. When only gas passes through conduit 104 and impinges probe segment 100, the condensation inside the segment is at a minimum resulting in the lowest value of heat input necessary to maintain the device at a fixed temperature differential. The heat input is monitored and determined in terms of the total power as measured by the amperage and voltage on the ammeter and voltmeter 120 and 122. However when a mixture of gas and liquid contacts the probe segment 100, the amount of condensation inside the segment increases resulting in a somewhat higher value of heat input necessary to maintain the fixed temperature differential. Suitable vaporizable liquids include methyl alcohol, acetone, water, glycols and Freons (fluorinated hydrocarbons) for lower operating temperatures. For high operating temperatures such as in the presence of molten liquid metals, mercury, sodium, or lithium may be utilized.

When operating the device in this manner a versatile system is achieved. A small change in the ratio of liquid to vapor in the process stream, significantly changes in the heat transfer balance and the electrical heat input required to maintain the probe segment 100 at a fixed small temperature differential, $\Delta T$, above the average temperature of the impinging two-phase flow stream within the conduit 114.

This measured heat, $Q_m$, provides an indication of the liquid impacting the probe, if the heat transfer to the gaseous or vapor phase alone and heat losses are subtracted from the reading. If the two-phase mixture is a single component such that the liquid is re-evaporated from the probe, then the mass of impacting liquid is just given by $$\dot{m}_1 = \frac{Q_m - Q_v - Q_1}{L_v + c_p \Delta T}$$

where $\dot{m}_1$ is the total liquid mass flow rate that impacts the probe and sticks to it.

$Q_m$ is the measured heat flow (calculated from the voltage and amperage of heater 112).

$Q_v$ is the heat flow to the vapor alone to maintain the probe at a temperature difference of $\Delta T$, above the stream.

$Q_1$ is the heat loss from the probe to the surrounding structure.

$L_v$ is the latent heat of the liquid.

$c_p$ is the sensible heat of the vapor.

If a two-component two-phase mixture is impacting the probe then $$\dot{m}_1 = \frac{Q_m - Q_v - Q_1}{c_p \Delta T}$$

It is to be understood that only preferred embodiments of the invention have been disclosed, and that numerous substitutions, alterations and modifications are all permissible without departing from the scope of the invention as defined in the following claims.

What is claimed is:

1. A method of determining the relative amount of a component of a two-phase body of fluid comprising the steps of:
   inserting into a container for said body of fluid a first portion of a hollow heat conducting probe which is closed at both ends and contains a vaporizable internal heat exchange fluid;
   extending a second portion of said probe exterior to said container;
   exchanging heat between said first portion and each of said phases by evaporation and condensation of said internal fluid;
   transferring heat between said portions; and
   measuring a parameter related to the amount of heat exchanged between said first portion and said phases to determine said relative amount.

2. A method according to claim 1 further including the steps of initially calibrating said first portion of the probe by determining the amount of heat exchanged between the probe and bodies of fluid containing from 100% liquid to 100% vapor and recording said amount of heat exchange.

3. A method according to claim 1 in which said heat is transferred by the movement of said internal fluid from said first portion to said second portion.

4. A method according to claim 3 wherein said internal fluid moves by capillary flow.

5. A method according to claim 4 wherein said capillary flow is increased by providing a capillary wick along the interior wall of said probe.

6. A method according to claim 1 wherein said two-phase body of fluid is a static body of fluid and the level of said fluid is determined by analyzing the ratio between the phases of said fluid.

7. A method according to claim 1 in which said body is a moving stream.

8. A method according to claim 1 in which said internal fluid condenses at a temperature slightly above the temperature of said two-phase body and said condensed internal fluid is transferred to said second portion where it is evaporated by an external heater applied to said second portion section and the amount of heat necessary to maintain said probe at a constant temperature is determined.

9. A method according to claim 1 wherein said internal fluid boils at a temperature slightly below the temperature of said two-phase body of fluid and said vapor is transferred to said second portion where it is condensed and the temperature of said second portion is determined.

10. A device for quantitatively analyzing the distribution between a two-phase body of fluid stored within a container comprising:
    a hollow, elongated probe having a first portion including a first closed end insertable into said container into heat exchange contact with both of said phases;
    a second portion of said probe including a second closed end extending without said container;
    means for transferring heat between said first and second portions comprising a vaporizable, internal, heat exchange fluid flowing cyclically between said portions; and
    means associated with said second portion for determining the amount of heat exchanged between said first portion and said phases.

11. A device according to claim 10 wherein said closed end probe further contains a capillary wick lining the interior walls of said probe for transferring the internal fluid between said portions.

12. A device according to claim 11 wherein said internal fluid is a liquid metal.

13. A device according to claim 10 wherein said closed end probe includes an internal fluid condensible at the temperature of said two-phase body of fluid and further includes a heating element associated with said second portion and means for determining the amount of power supplied to said heating element.

14. A device according to claim 11 wherein said internal fluid vaporizes at the temperature of said two-phase body of fluid.

15. A device according to claim 10 wherein said determining means comprises means for sensing the temperature of said second portion.

References Cited

UNITED STATES PATENTS

| | | | |
|---|---|---|---|
| 2,931,224 | 4/1960 | Anderson | 73—295 |
| 2,978,691 | 4/1961 | Beher | 73—295X |
| 3,283,576 | 11/1966 | Halpin et al. | 73—295 |
| 3,308,665 | 3/1967 | Williams et al. | 73—295 |

FOREIGN PATENTS

| | | | |
|---|---|---|---|
| 1,042,188 | 9/1966 | Great Britain | 73—295 |
| 130,943 | 2/1951 | Sweden | 73—295 |

LOUIS R. PRINCE, Primary Examiner

J. W. ROSKOS, Assistant Examiner

U.S. Cl. X.R.

73—15, 295